2,997,132
METHOD FOR THE VENTILATING OF PLANTS FOR THE MANUFACTURE OF ALUMINIUM OR SIMILAR PRODUCTS

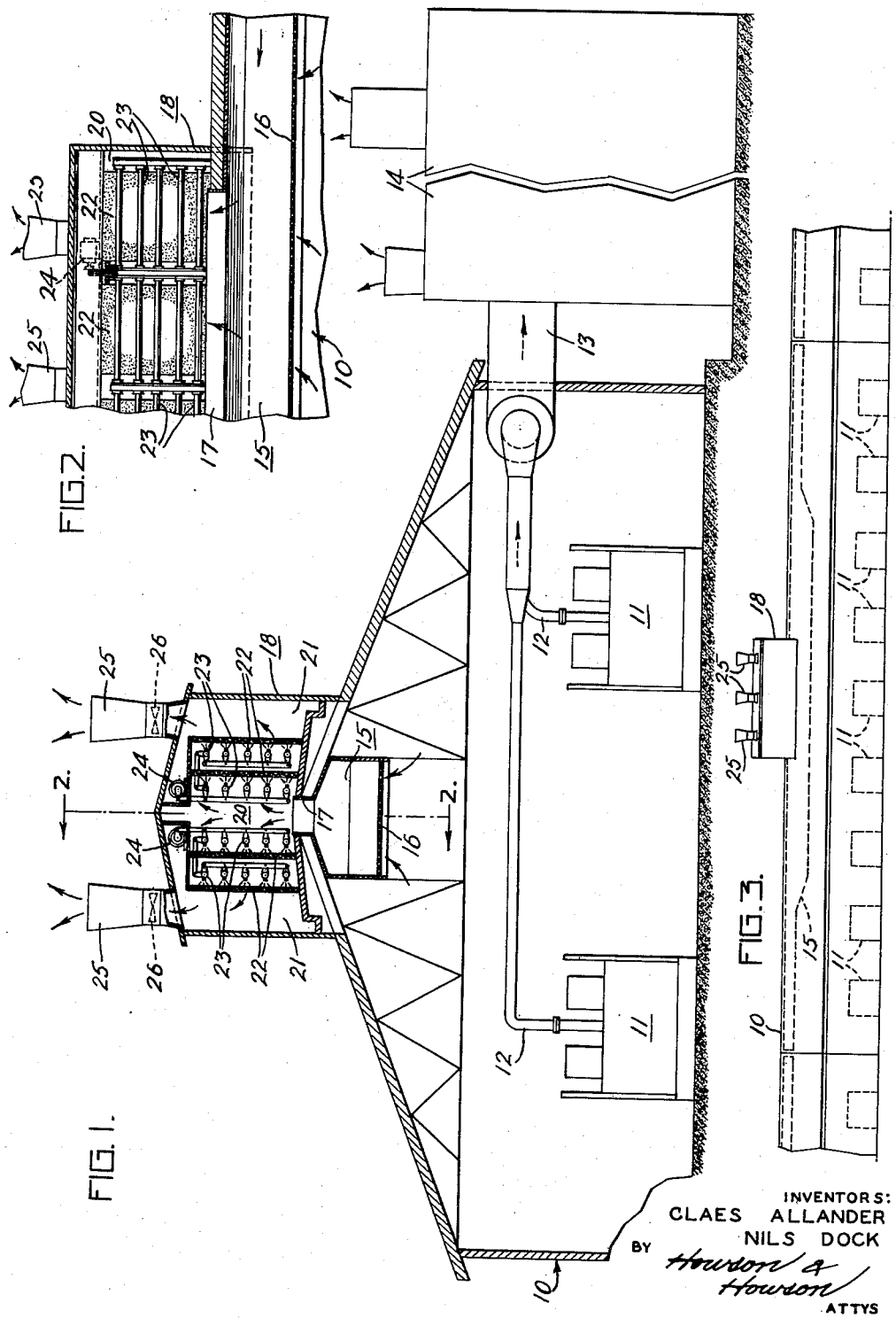

Claes Allander, Sodra Angby, and Nils Dock, Bromma, Sweden, assignors to Aktiebolaget Svenska Flaktfabriken, Kungsgatan, Stockholm, Sweden
Filed Mar. 21, 1957, Ser. No. 647,467
Claims priority, application Sweden Mar. 23, 1956
1 Claim. (Cl. 183—121)

The present invention relates to an improved method for ventilating plants for the manufacture of aluminum or similar products.

In such plants, injurious gases which are commingled with fluorine-containing dust or similar impurities issue from the smelting furnaces, and it is common practice to exhaust the injurious gases at each furnace, and clean the same by washing since, owing to their injurious action, they cannot be allowed to escape in this condition. The washing, if desired, may be combined with utilization of the precipitated substances such as disclosed, for instance, in the Norwegian patent specifications 57,289 and 58,473.

Experiments have, however, shown that in spite of careful exhaustion of the gases from the furnaces the air in the locations surrounding the furnaces has proved to contain some quantity of fluorine. Because of the great heat emission, especially in the summer, there is a need for strong ventilation at said locations. Even if the fluorine-content is very low, the quantity of air used may be so great that the total quantity of fluorine in this air can be considerably greater than that in the exhaust gases from the furnaces and there is therefore a necessity for cleaning this air. Owing to the great air quantities, the low concentration of dust and gas and the smallness of the dust particles, often below 1 $\mu$, in the air this air can not be effectively and efficiently treated by the above-mentioned washing or by any other previously-used separating method.

The invention, the main object of which is to secure an effective and economical cleaning of the air surrounding the furnaces, is characterized in that the ventilation of the plant is accomplished partly by exhausting the evolved gases at each furnace, and cleaning the same by washing, if desired in combination with utilizing the precipitated substances, and partly by a common ventilation of the locations by exhausting the air in the locations along substantially the whole length of the ceiling, which air before its discharge is caused to pass a filter surface at low velocity. The filter surface consists of one or more, preferably vertically arranged filter mats having a thickness determined to provide a suitable pressure drop and having filling bodies of fibres or threads of a material having a very glassy surface, for instance plastic. The filter mats are intermittently sprayed with water or other suitable cleaning liquids at least on one side by means of one or more rows of oscillating jets.

Cleaning of the filter surfaces may be accomplished by using reasonable liquid quantities because of such intermittent spraying of liquid by means of one or more rows of oscillating nozzles. The consumption of liquid may be kept at a low level by an addition of a neutralizing substance to the cleaning liquid, which substance precipitates the impurities whereby the cleaning liquid may be recirculated. It is most economical to use filter mats of such a thickness that the pressure drop over each of the filter mats amounts to about 3–15 millimeters water column. The number of filter mats being arranged after each other is determined with respect to the prevailing dust concentration and the desired degree of purity.

A suitable arrangement for performing the method of the present invention is shown in the attached drawing, wherein:

FIG. 1 is a transverse sectional view through a plant practicing the method of the present invention;

FIG. 2 is a sectional view taken on the line 2—2 of FIG. 1 with portions broken away; and FIG. 3 is a side elevation at a reduced scale of the plant shown in FIG. 1.

Referring now to the drawing, the plant comprises a building 10 having a plurality of smelting furnaces 11 at separate locations therein. The furnaces are each connected by a branch duct 12 to an exhaust-gas conduit 13 which discharges into a scrubber 14, or other suitable washing apparatus of standard design. The air surrounding the furnaces 11 is discharged along substantially entire length of the building 10, for example through an exhaust duct 15 mounted at the ceiling of the building and extending substantially the entire length. The bottom of the duct is provided with perforations 16 or other openings, and the top of the duct is open as indicated at 17 into the central space 20 of a skyline or cupola 18 of the building.

The skylight 18 is divided into central and side spaces 20 and 21 respectively, by vertically-disposed filter mats 22 of the character set forth above. The inner surface of each mat is intermittently sprayed with water or other suitable cleaning liquid by jets formed by nozzles 23 which are oscillated, for example by a drive motor and connections 24. To provide sufficient draft, the filtered air is discharged through diffusers 25 by fans or blowers 26.

While a particular plant has been herein illustrated and described, it is apparent that the method of the present invention may be practiced in other plants without departure from the invention as defined in the appended claim.

What we claim is:

In a plant for manufacturing aluminum or similar products having a plurality of smelting furnaces at separate locations along the length of the plant, the method of ventilating the plant comprising the steps of separately exhausting the gases including fluorine evolved from each furnace and washing the exhausted furnace gases to clean the same, exhausting the air including fluorine surrounding the furnaces from all of the locations along the entire length of the plant whereby a great quantity of air is exhausted at low velocity, filtering said low-velocity exhausted air by passing it through vertically-disposed filtering mats having filling bodies of glassy-surfaced threads or fibers, and intermittently spraying at least one face of said mats by oscillating jets of cleaning liquid.

References Cited in the file of this patent

UNITED STATES PATENTS

| | | |
|---|---|---|
| 14,139 | Medcalfe | Jan. 22, 1856 |
| 1,552,316 | Krieg | Sept. 1, 1925 |
| 1,967,940 | Johnson | July 24, 1934 |
| 2,057,579 | Kurth | Oct. 13, 1936 |
| 2,612,966 | Nicol | Oct. 7, 1952 |
| 2,725,117 | Borgerd | Nov. 29, 1955 |
| 2,730,195 | Roberts | Jan. 10, 1956 |